Dec. 23, 1930.  R. KROLLAGE  1,786,117
OIL VAPORIZER
Filed Aug. 29, 1927

INVENTOR.
Rudolph Krollage,
BY
ATTORNEY.

Patented Dec. 23, 1930

1,786,117

UNITED STATES PATENT OFFICE

RUDOLPH KROLLAGE, OF McGREGOR, TEXAS

OIL VAPORIZER

Application filed August 29, 1927. Serial No. 216,252.

This invention relates to fuel oil separators and vaporizers.

It is now quite common in the use of tractors or other motor driven farm implements, to start the tractor by the use of gasoline and after the same has been in operation a sufficient time to generate heat, the gasoline is cut off from the engine and kerosene or other cheaper fuel oil used to continue the operation. However, kerosene in the use of such implements, entails quite an expense, and it is the object of the present invention to employ gasoline for starting the engine and to subsequently substitute crude oil in a vaporized condition to continue the operating of the engine. In this manner, the expense incident to operating such machinery is materially reduced.

Broadly, my invention might be stated to comprise means for heating the crude oil by passing it through the exhaust manifold of the engine, and subsequently separating out the lighter vapors of the crude oil and conducting the same to the intake manifold of the engine, where they are distributed to the engine cylinders. In addition, a secondary separation is provided so that any of the lighter gases that were not separated out in the first separating operation can be extracted from the crude oil and returned to the first separator and from there to the intake manifold.

The idea of employing crude oil for use in internal combustion engines and the heating and separating out of lighter gases, is already old, being shown in Patent No. 1,460,063, issued to M. A. Jones, E. C. Yeager, and myself June 26, 1923, and the present invention is an improvement thereon, in that it provides for a secondary separation or vaporization of the crude oil.

Figure 1:
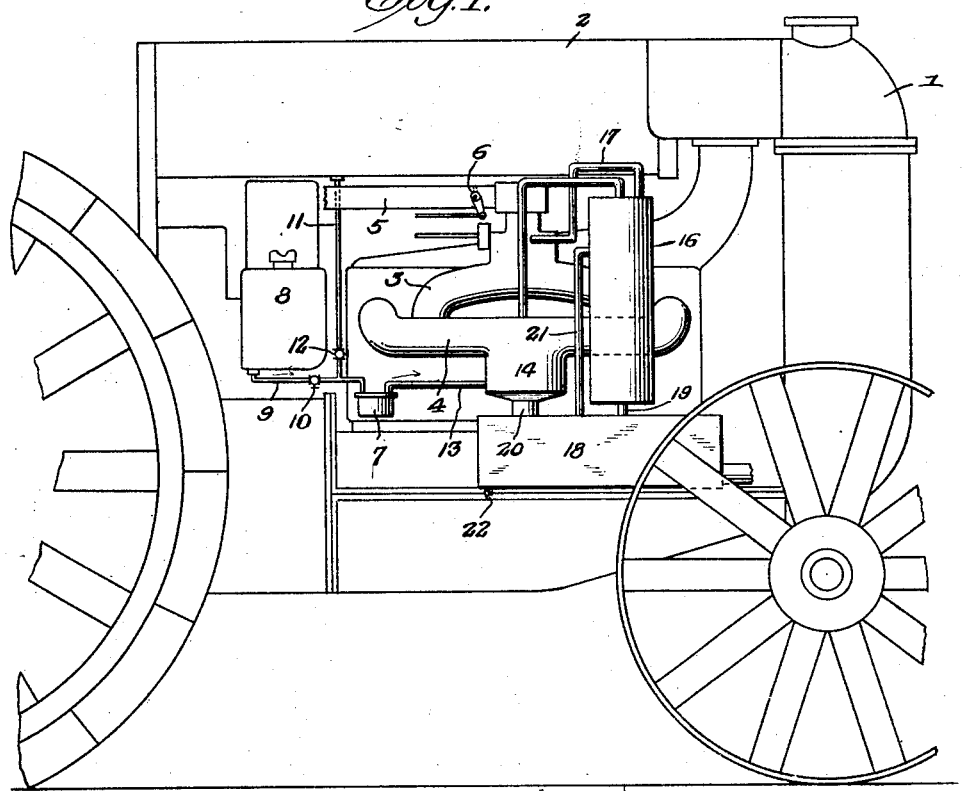
Figure 2:
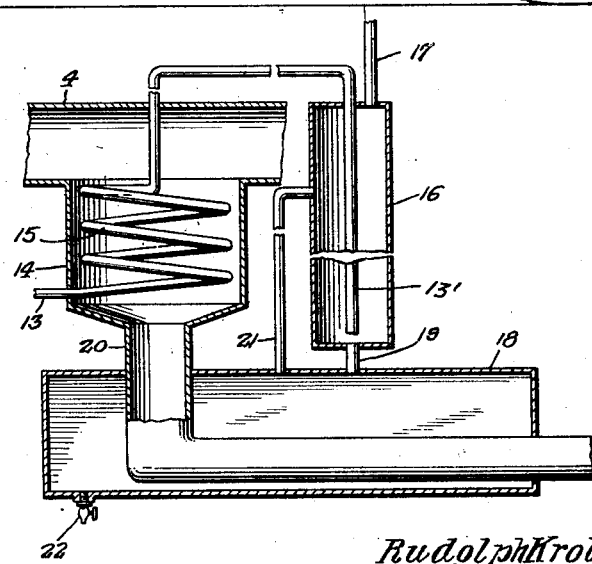

Referring to the drawings, which form part hereof, and in which corresponding numerals are used throughout the figures, Fig. 1 is a side elevation of a conventional form of tractor equipped with the apparatus made in accordance with the present invention, and Fig. 2 is a vertical longitudinal sectional view through the exhaust manifold of the engine and the primary and secondary separating chambers, showing the interior construction thereof.

In the drawings, 1 indicates a conventional type of tractor provided with a liquid fuel tank 2, intake manifold 3, and exhaust manifold 4, by means of which the liquid fuel is conducted to and away from the cylinders of the tractor engine.

The intake manifold 3 is provided with an air mixer 5 of the conventional type and the supply of air passing to the intake manifold is controlled by means of the valve 6, all of which is customary in present tractor construction.

Supported on the engine block or in any suitable location, but preferably adjacent the carburetor 7, I provide a relatively small gasoline tank 8 from which a pipe 9 conducts the gasoline to the carburetor and thence to the intake manifold, as will be hereinafter explained. In the pipe 9 a valve 10 is provided by means of which gasoline may be cut off from the carburetor after the engine has been heated sufficiently to operate on the crude oil.

The liquid fuel tank 2 containing crude oil is connected to the carburetor 7 by means of a small pipe 11 so that the crude oil may be led directly to the carburetor after the valve 10 has been closed so as to cut off the supply of gasoline. In this pipe line 11, I provide a valve 12 which controls the flow of crude oil from the fuel tank to the carburetor.

Secured to the opposite side of the carburetor 7 is an outlet pipe 13 which passes through an enlarged chamber 14 cast integrally with the exhaust manifold and within this chamber the outlet pipe 13 is given a coiled formation as indicated at 15, so that in traversing the length of the pipe it will have ample time to be heated by the hot exhaust gases passing from the engine. This pipe 13 is then passed upwardly through the exhaust manifold and into the upper end of a separating chamber 16, and it is to be noted that this pipe 13 has an end 13' projecting downwardly into the separating chamber 16 a considerable distance, so as to allow sufficient time for complete separation to take place.

Leading from the separating chamber 16 is an inlet pipe 17 which conducts the vaporized liquid fuel into the intake manifold of the engine.

Heretofore, it has been customary to connect the pipe leading from the carburetor to the separating tank by passing it through the side wall thereof, as is clearly illustrated in Patent No. 1,460,063. It has been found, however, that such construction does not function properly because of the fact that the suction created in the intake manifold of the engine tends to draw the liquid fuel directly from the mouth of the pipe into the intake manifold without allowing sufficient time for separation to take place. In the present invention, however, the part 13' of the outlet pipe 13 is projected vertically downwardly through the upper end of the separating chamber 16 so that suction created by the intake manifold draws the liquid fuel from this downwardly directed end of the pipe 13 to substantially the bottom of the separating chamber 16, so that sufficient time is permitted during the rise of the vaporized liquid fuel through substantially the complete length of the separating chamber 16 to accomplish thorough separation of the lighter and heavier liquid fuels. The lighter oil vapors and gases pass upward through the pipe 17, while the heavier liquid oil fractions are separated from the vapors and gases and passed downwardly through the conduit 19 into a circular separator or chamber 18. To insure further vaporization of the crude oil, I provide the supplemental separator or chamber 18 located below the first separator 16 and connected thereto by means of a suitable conduit 19, so that the heavier oils which pass to the bottom of the separator 16 will flow into the secondary separator 18 for further vaporization.

Leading from the enlarged chamber 14 of the exhaust manifold is the exhaust pipe 20, which is provided with a right angle bend and extends throughout substantially the entire length of the supplemental separator 18, so that the oil which passes from the separator 16 into the supplemental separator 18 is further vaporized by the hot gases passing through the exhaust outlet 20.

To insure utilization of the gases generated in the supplemental separator 18 I connect the same with the separator 16 by means of a pipe 21, so that the vaporized liquid fuel is again passed into the separator 16 and thence to the intake manifold through the inlet pipe 17.

From the foregoing it will be seen that I have provided efficient means for thorough vaporization of the crude oil in providing a primary and a secondary separating step, but it is to be noted that the heat required for the vaporization in both instances is supplied from the exhaust manifold of the engine, so that a relatively simple and cheap construction is provided.

At one end of the supplemental separator 18, I provide an outlet valve 22 by means of which the heavier oil which has not been vaporized may be removed when occasion arises.

In describing the present invention, I have stated that the outlet pipe 13 is coiled as at 15, but it is to be understood, of course, that it may take other forms so long as a sufficient length of pipe is provided in the enlarged chamber 14 to warrant thorough heating of the crude oil, and while I have illustrated the primary and secondary separators as being located in certain positions, it is to be understood that such location may be changed without departing from the spirit of this invention. In addition I desire it to be understood that this invention is not limited to use in connection with tractors, but may be used in connection with internal combustion engines regardless of the use to which they may be put.

What is claimed is:

In oil vaporizing apparatus, a crude oil supply tank, an intake manifold and an exhaust gas manifold, the said exhaust manifold having an enlargement, a primary oil separator and vaporizer, a crude oil conduit connected with the crude oil tank and having a coil within the enlargement in the exhaust manifold whereby exhaust gases heat the said crude oil, said crude oil conduit passing vertically downward through the top of the primary separator and having a depending portion extending through a greater part of the length of the separator, a second oil separator and vaporizer surrounding a portion of the exhaust manifold to receive heat therefrom, a conduit connecting the primary and secondary separators and causing residual fuel oil to pass to the secondary separator to be vaporized therein, a second conduit connecting the two separators to cause vaporized oils to be returned to the primary separator, and a conduit extending from the primary separator to the intake manifold and connected to the primary separator above the lower end of the depending portion of the crude oil conduit, whereby vaporized oils from both separators are conveyed to the intake manifold.

In testimony whereof I have hereunto set my hand.

RUDOLPH KROLLAGE.